Jan. 28, 1964    F. E. KNECHT    3,119,177
METHOD OF PLUGGING TUBULAR STRUCTURES
Filed Dec. 5, 1961    2 Sheets-Sheet 1
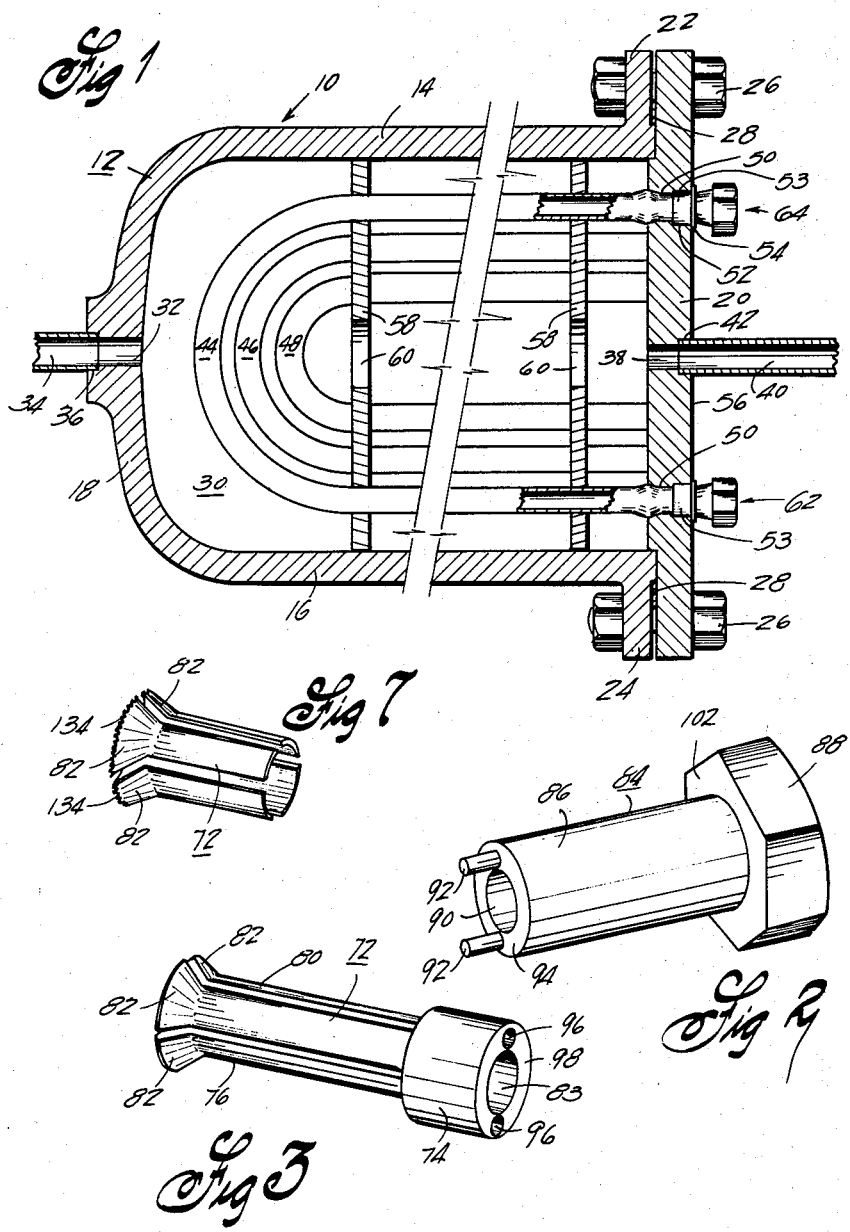
INVENTOR.
Forrest E. Knecht
BY Arthur L. Collins
Attorney

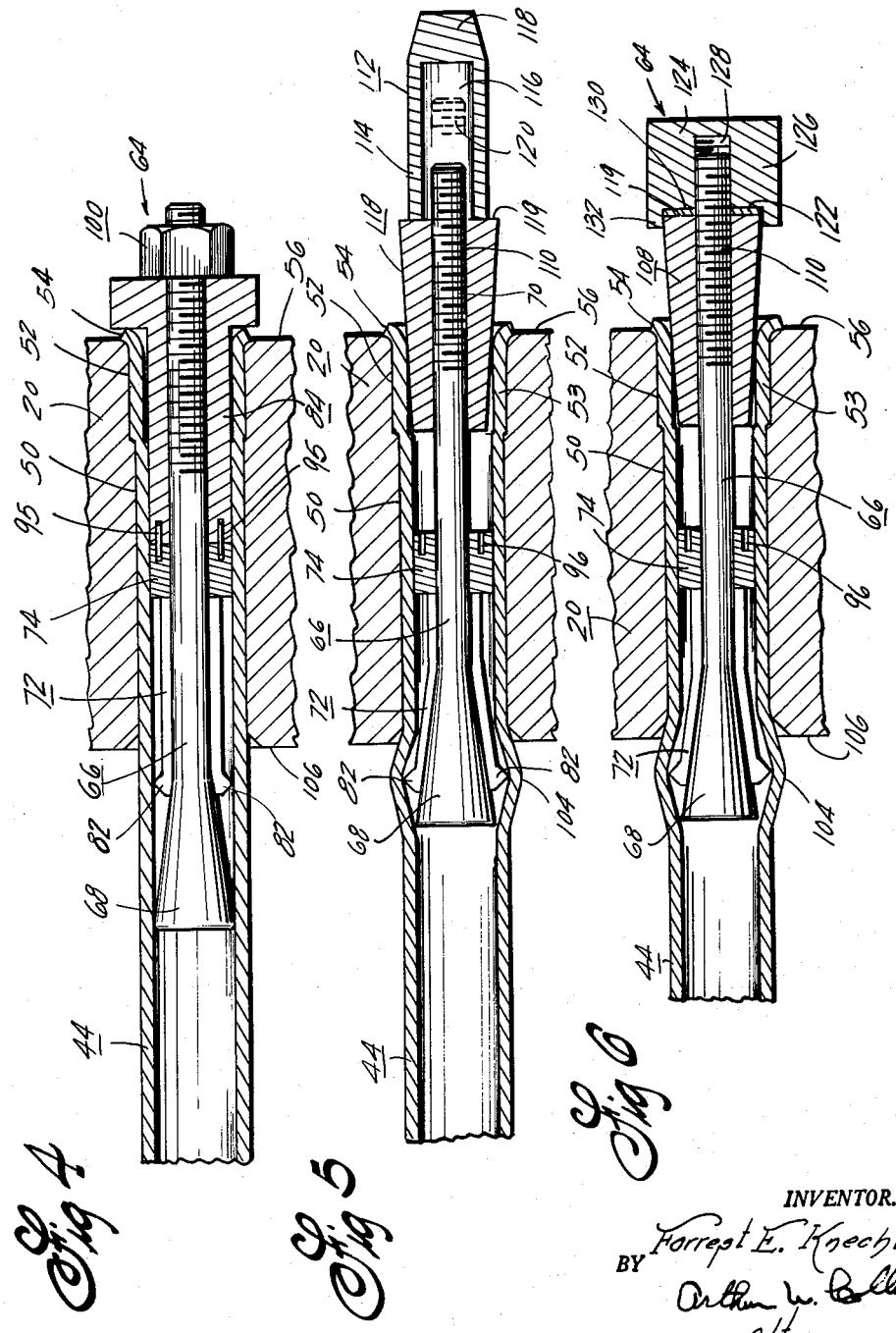

United States Patent Office 3,119,177
Patented Jan. 28, 1964

3,119,177
METHOD OF PLUGGING TUBULAR STRUCTURES
Forrest E. Knecht, Catawba Ave., Newfield, N.J.
Filed Dec. 5, 1961, Ser. No. 157,279
1 Claim. (Cl. 29—401)
(Granted under Title 35 U.S. Code (1952), sec. 266)

The invention described herein may be manufactured and used by or for the Government of the United States of America for governmental purposes without the payment of any royalties thereon or therefor.

This is a continuation-in-part of co-pending application, Serial No. 831,918, filed August 5, 1959, now abandoned.

This method relates to a method of plugging the open ends of tubes and more particularly to a novel and improved method of plugging the open ends of heat exchanger tubes or the like.

Plugging the ends of a leaking or completely fractured heat exchanger tube to temporarily remove the tube from use or service becomes a relatively simple procedure when the fluid pressure within the tube exceeds the fluid pressure outside of the tube, i.e., exceeds the pressure of the fluid in which the tube is immersed or the pressure of the surrounding medium. In this particular situation, an ordinary or conventional tapered plug can be driven into both ends of the tube to not only prevent the flow of fluid through the tube but also to prevent the leakage of fluid between the tube and the tube sheet or header. The differential pressure acting on the plug will constantly urge the plug into engagement with the end of the tube and thus rigidly retain the plug in its desired position of intended use.

On the other hand, when the pressure of the medium in which a heat exchanger tube is immersed exceeds the pressure of the fluid circulating within the tube and the tube developes a leak or becomes completely fractured, a conventional tapered plug cannot be successfully employed to remove the tube from service. In this particular situation, the surrounding medium will enter the tube and the differential pressure created thereby will act on the plug and "blow" or remove the plug from the end of the tube. When such a differential pressure exists, it becomes imperative therefore that means be provided to rigidly anchor the plug within the end of the tube.

Accordingly, one object of the present invention is to provide a novel and improved method of preventing a plug from being removed or "blown" from the end of a heat exchanger tube or the like by a differential pressure acting thereon.

Another object of the invention is to provide a novel and improved method of plugging the end of a heat exchanger tube or the like immersed in a high pressure medium.

Another object of the invention is to provide a novel and improved method of rigidly anchoring a plug in the end of a heat exchanger tube or the like without damaging the tube sheet or header.

Another object of the invention is to provide a novel and improved method of rigidly anchoring a plug in the end of a heat exchanger tube or the like by radially deforming a portion of the tube.

In conformity with these objects, the apparatus used to plug the tube in the present invention is characterized by an elongated rod or the like having an expander head on one end thereof and terminating at the opposite end thereof in a threaded portion. The rod is adapted to slideably carry an expansible means in the form of a split-sleeve or the like together with a positioning member which is operatively connected to the split-sleeve. In use, the split-sleeve and the positioning member are placed on the rod followed by a take-up nut which is carried on the threaded portion of the rod. This unit assembly is then inserted into the open end of the tube to be plugged with the positioning member predetermining the depth of insertion of the rod. The take-up nut is then applied to the threaded portion of the rod to expand the split-sleeve into contact with the tube to radially expand the tube and thereby rigidly anchor the rod therein. The take-up nut and positioning member are then removed from the rod and a plug is placed thereon and driven into the open end of the tube. A sealing means and a cap nut are then applied to the threaded portion of the rod to rigidly retain or anchor the plug in the open end of the tube and prevent the leakage of fluid between the rod and the plug.

The above mentioned and other objects of the present invention will become readily apparent to those skilled in the art from the following detailed description of a specific embodiment thereof taken in connection with the accompanying drawings, wherein:

FIG. 1 is a vertical section through a heat exchanger employing the plugging device of the present invention;

FIG. 2 is a perspective view of the positioning member utilized in the specific embodiment of the invention;

FIG. 3 is a perspective view of the expansible means or split-sleeve;

FIG. 4 is a longitudinal section through a heat exchanger tube showing the unit assembly of the rod, split-sleeve and positioning member prior to expansion of the split-sleeve;

FIG. 5 is another longitudinal section through the heat exchanger tube showing the rod anchored to the tube and the insertion of the plug; and FIG. 6 is another longitudinal section through the heat exchanger tube showing the final assembly of the components of the plugging device with the plug thereof being rigidly anchored in the end of the tube;

FIG. 7 is a fragmentary perspective view showing another embodiment of the split-sleeve.

Referring more particularly to FIG. 1, there is shown a heat exchanger 10 of the fluid-cooler-type which includes a housing or the like 12 defined by a top wall 14, a bottom wall 16, and an end wall 18. The end of housing 12 opposite end wall 18 includes another end wall 20 which in this particular instance takes the form of a tube sheet or tube header. Tube sheet 20 is rigidly connected to the housing top and bottom walls 14 and 16 by a plurality of bolts 26 (only two shown) which extend through aligned holes or passages (not shown) in the tube sheet and flanges 22 and 24 on the top and bottom walls, respectively. A sealing means 28 in the form of a packing or the like is carried between the opposing surfaces of the tube sheet 20 and the flanges 22 and 24 to insure a substantially leak-proof connection between the tube sheet 20 and the top and bottom walls 14 and 16 of the housing.

Inasmuch as the heat exchanger 10 in this particular illustration of the invention is of the fluid-cooler-type, the housing 12 thereof carries or receives a high temperature and high pressure fluid 30 which high temperature and high pressure fluid 30 is circulated through the housing. Housing 12 is accordingly provided with an inlet 32 in the end wall 18 thereof and the inlet 32 is adapted to receive fluid from a conduit or the like 34 which communicates with a high temperature and high pressure fluid source (not shown). Housing end wall 18 is counterbored at 36 to provide a seat for the end of conduit 34 and any suitable means (not shown) may be employed to rigidly connect the conduit 34 to housing end wall 18 and also to provide an effective sealing arrangement. Tube sheet 20 is provided with a fluid outlet 38 therein which in turn communicates with an outlet conduit 40.

The tube sheet 20 is likewise counterbored at 42 to receive one end of the outlet conduit 40 and the outlet conduit 40 is similarly connected to the tube sheet by any suitable means (not shown) which will afford both a rigid connection and an effective seal.

The high temperature and high pressure fluid 30 being circulated with heat exchanger housing 12 is cooled or reduced in temperature by another medium of some suitable type which is adapted to be circulated through the housing 12 in a plurality or bundle of tubes. In this particular instance, only three of such tubes 44, 46 and 48 are shown in the bundle for the purpose of illustration although it will be appreciated that in practice the heat exchanger 10 could and would in most applications contain a tube bundle consisting of many more tubes. The tubes 44, 46 and 48 are substantially U-shaped and the terminal portions thereof are carried by or secured to the tube sheet 20. The specific mounting of the tubes in the tube sheet 20 is identical for each tube and can best be explained with reference to tube 44 wherein it can be seen that the tube sheet 20 is provided with a pair of holes or passages 50—50 therein, each of which is counterbored at 52—52. The terminal portions of the tube 44 are received and secured within the passages 50—50 by being rolled into the passages with the tube wall of these terminal portions being deformed at 53—53 to the counter of the counterbores 52—52 and the ends of the tube being provided wtih flanges or lips 54—54 thereon which sealingly engage the outside face 56 of the tube sheet 20. Being so deformed and flanged, the tube 44 is thus rigidly connected to the tube sheet 20 and is also expanded into sealing engagement therewith to prevent the leakage of high pressure fluid between the terminal portions of the tube and tube sheet.

Tubes 44, 46 and 48 are supported intermediate their ends by a plurality of sub-headers or support members 58 (only two shown) which extend substantially transversely of the housing 12 and are secured to the housing walls 14 and 16 by any suitable means (not shown). Tube support members 58 are each provided with a plurality of passages therein (no reference numerals) to accommodate the passage therethrough of the tubes 44, 46 and 48 and the tubes may be secured to the support members 58 by any suitable means (not shown) such as welding, brazing or the like. Each support member is also provided with an enlarged aperture or port 60 therein to permit the flow of fluid through the housing 12.

The inlet ends of tubes 44, 46 and 48, i.e. the ends of the tubes above passage 38 in tube sheet 20 in FIG. 1, are adapted to be supplied with a suitable cooling medium from an inlet manifold or the like (not shown) which in this particular instance is adapted to be secured to the outer face 56 of tube sheet 20. This inlet manifold (not shown) is shaped to enclose all of the inlet ends of the tubes in the tube bundle and may be secured to the outside face 56 of the tube sheet by any suitable means. The inlet manifold in this specific embodiment of the invention is adapted to supply the tubes 44, 46 and 48 with water at a relatively low pressure and the manifold may be connected by any suitable means to a water source (not shown). An outlet manifold (not shown) similar in construction to the inlet manifold is also carried by the tube sheet to provide a common receptacle for receiving the cooling water or the like discharged from the outlet ends of the tubes in the tube bundle.

It will also be noted in FIG. 1 that both ends of tube 44 are plugged with a pair of plugging devices 62 and 64 contemplated by the present invention. Both of the plugging devices 62 and 64 are rigidly secured within the ends of tube 44 and both plugging devices 62 or 64 are identical in construction and application. For the sake of brevity, only one of the plugging devices 64 will be described in detail immediately hereinafter.

Referring now to FIGS. 2, 3 and 4, the apparatus used in the improved method of the present invention includes an elongated rod means or rod 66 having an expander means or expander 68 in the form of a substantially frusto-conical shaped hood on one end thereof and terminating in a threaded portion 70 at the opposite end thereof. Rod 66 preferably is selected of a predetermined length and the expander head 68 thereon is of necessity limited to a maximum permissible diameter as will be discussed more in detail hereinafter. The expansible split-sleeve 72 is adapted to be slideably carried by the rod 66 and is comprised of a substantially cylindrical head or the like 74 to which is secured a plurality of annularly arranged sleeve members, four in number in this particular instance although only three of the sleeve members 76, 78 and 80 are shown. The sleeve members extend substantially axially of the cylindrical head 74 and in this particular embodiment of the split-sleeve 72 are integrally formed with the head 74. The free end of each sleeve member carries an enlarged bearing means or bearing element 82 (only three shown) and the bearing elements are in this instance substantially triangular-shaped in cross-section. The head 74 of the sleeve 72 is also provided with an axial bore 83 therein to accommodate the passage therethrough of the rod 66.

The tube plugging device furthermore includes a positioning means or positioning member 84 which is also adapted to be slideably carried on rod 66. Positioning member 84 is comprised of a substantially cylindrical body portion 86 which has a predetermined length and terminates in an enlarged head 88 at one end thereof, head 88 in this particular instance being substantially hexagonal-shaped. Body portion 84 has an axial bore 90 therein to receive the rod 66 and also carries a pair of diametrically opposed pins 92—92 which extend substantially axially of the enlarged head 88 and body portion 86. The pins extend from the end wall 94 of the body portion 86 and are anchored in a pair of passages 95—95 (FIG. 4) in body portion 86 by any suitable means (not shown). Pins 92—92 in function serve as a means to prevent relative rotation between split-sleeve 72 and positioning member 84 and are adapted to be received in a pair of diametrically opposed holes or passages 96—96 formed in the end wall 98 of split-sleeve head member 74.

In operation or use to plug a tube such as tube 44 in FIG. 4, the expansible sleeve 72 is first placed or "slipped" on rod 66 followed by the positioning member 84 with the pins 92—92 in the positioning member 84 being inserted into the passages 96—96 in the split-sleeve. A take-up nut 100 is then threaded on the threaded portion 70 of the rod 66 until the bearing members 82 on the split-sleeve engage the expander head 68 on the rod 66, or until the components carried by the rod 66 assume the position shown in FIG. 4. With the components so assembled on the rod 66, this unit assembly is then inserted into the open end of tube 44 until the undersurface 102 of positioning member head 88 engages the flanged end 54 of the tube. The expansible sleeve 72 is now ready to be expanded into contact with the inner periphery of the tube 44 to anchor the rod 66 within the tube.

To anchor rod 66 within the tube, referring now to FIGS. 4 and 5, a wrench or the like (not shown) is applied to the hexagonal-shaped head 88 on the positioning member 84 followed by the placement of another wrench (not shown) on the take-up nut 100. With the positioning member 84 being held against rotation by the wrench, the take-up nut 100 is then turned and threaded inwardly on rod 66 to move the rod 66 axially of the tube 44 toward the open end thereof, or from left to right as shown in FIGS. 4 and 5. This axial movement of rod 66 will move the expander head 68 thereon within the split-sleeve 72 which in turn will expand the bearing members 82 of the sleeve into engagement with the inner periphery of the tube 44 to thus radially expand or deform the tube 44 at point 104 and rigidly anchor the rod 66 within the tube. In this specific embodiment of the invention, it will be noted that the tube 44 is radially expanded at point 104 in close proximity to the rear or inner face 106 of the tube sheet 20 or at a point adjacent to where the tube 44 enters the passage 50 in the tube sheet 20. Radial expansion of the tube 44 at this point will obviously provide a more rigid anchor between the tube 44 and the rod 66 and will also serve to enhance the sealing engagement between the tube 44 and the wall of the passage 50 in the tube sheet. The amount or degree of deformation of tube 44 to produce a rigid anchor between the rod 66 and tube 44 will of course vary with the particular material of which the tube 44 is made. A tube made of hard material would require less deformation than a tube made of a soft material to rigidly anchor the rod 66 and consequently would result in less travel of the take-up nut 100.

It will also readily be appreciated in viewing FIGS. 4 and 5 that the length of the positioning member 84 predetermines the depth of insertion of the rod 66 and in so doing predetermines the exact position where the rod 66 will be anchored within the tube 44 by locating the exact point where the bearing members 82 on the split-sleeve 72 will be expanded into contact with the inner periphery of the tube. It will also be appreciated that the diameters of the positioning member 84, the split-sleeve 72 and the expander head 68 on the rod will be limited by the inside diameter of the particular tube in which they are to be inserted.

After the rod 66 is rigidly anchored within the tube as shown in FIGS. 4 and 5, the take-up nut 100 is unthreaded or removed from the rod 66 and the positioning member 84 is removed from the end of the tube 44. After removal of the positioning member 84, a plug means or plug 108 is placed on the portion of the rod 66 projecting from the tube 44 and the plug 108 is driven into the open end of the tube. The plug 108 in this specific embodiment of the invention takes the form of a tapered, substantially cylindrical in cross-section plug having an axial bore 110 therein for accommodating the passage therethrough of the rod 66. The specific dimensions of the plug such as the length and the maximum diameter thereof will of course be governed by the inside diameter of the open end of tube 44 and the material of which the tube is made. Suffice it to say, however, that in most instances the plug 108 should be dimensioned so that when driven into the tube approximately half its length as shown in FIG. 5, the outer periphery of the plug 108 will sealingly engage the inner periphery of the tube 44 and also urge or expand the outer periphery of the tube 44 into tight sealing engagement with the inner wall of passage 50 on the tube sheet 20. Thus, when the plug 108 is driven into the open end of the tube 44, it not only prevents the leakage of high pressure fluid between the plug and the inner periphery of the tube but also prevents the leakage of high pressure fluid between the tube 44 and the tube sheet 20.

Any suitable means may be employed to drive the plug 108 into the open end of tube 44 although in this specific embodiment of the invention the plug 108 is adapted to be driven into the tube 44 by means of a driving fixture or driving means 112 (FIG. 5). The driving fixture is comprised in this instance of a substantially cylindrical member 114 having an enlarged recess 116 therein and terminating at one end thereof in a substantially frusto-conical shaped head 118. In use, one end of the driving fixture 112 is placed against the end 119 of the plug 108 as shown in FIG. 5 with the end of the rod 66 being received in the enlarged recess 116. When the head 118 of the fixture is struck with a hammer or the like (not shown), the plug 108 will be driven into the tube. The enlarged recess 116 on the fixture is of sufficient depth to accommodate the added length of rod which will project beyond the end 119 of plug 108 when the plug is fully driven into the tube, the added length of rod 66 being shown in phantom and designated by reference numeral 120.

After the plug 108 is driven into the tube to the desired depth, it is preferable to remove or cut-off a portion of the added length of the rod projecting beyond the end 119 of the plug 108, more specifically to cut-off the portion 120 of the rod shown in phantom. Accordingly, in this specific embodiment of the invention, the take-up nut is then reapplied (not shown in the drawings) to the threaded portion 70 of the rod 66 and turned along the rod until it abuts the end 119 of the plug 108. The threaded portion projecting beyond the take-up nut 100 is then cut-off with a hack saw or the like to thereby provide a predetermined length of rod projecting beyond the end 119 of the plug 108. The take-up nut 100 thus serves as a means to measure the excess length of rod to be removed although it will be appreciated that any other suitable measuring means could be successfully employed.

After removing the excess length of rod 66, now referring to FIG. 6, means is then applied to the threaded portion of the rod for both preventing the leakage of fluid between the rod 66 and the bore 110 in the plug 108 and rigidly anchoring the plug 108 in the end of tube 44. Accordingly, in this specific embodiment of the invention, a seal means in the form of a gasket or the like 122 is applied to the threaded portion 70 of the rod followed by the application of a cap-nut 124 thereto. The gasket 122 in this instance is substantially identical in diameter to the maximum diameter of the plug 108 and may be made of any suitable material such as copper, aluminum or steel. The cap-nut 124 in this specific embodiment of the invention is comprised of a body portion 126 having a threaded, substantially axially extending passage 128 therein for receiving the threaded portion 70 of the rod 66 and provided with an annular recess 130 in one end defining an annular flange 132 in one end thereof. The annular recess has a predetermined diameter and in function serves as a seat for both the gasket 122 and the end 119 of the plug 108. The cap-nut 124 may be of any suitable cross-sectional configuration (not shown) such as square or hexagonal to accommodate the reception of a wrench or the like (not shown).

In operation, the cap-nut 124 is turned axially along the threaded end of the rod 66 until the gasket 122 is sufficiently compressed and urged into tight sealing engagement with the end 119 of the plug 108. With the cap-nut 124 so positioned on the threaded portion 70 of rod 66 and abutting the end 119 of the plug 108 through the medium of the gasket 122, the cap-nut 124 will prevent any relative movement between the plug 108 and rod 66 and thus rigidly retain or anchor the plug 108 in sealing engagement in the end of the tube 44. Radial deformation of the gasket 122 will be limited by the annular flange 132 on the cap-nut 124 and the radial deformation of the gasket will serve to urge the outer periphery of the gasket into tight sealing engagement with the inner periphery of the flange to thus insure a more positive seal between the cap-nut 124 and the gasket 122.

It will be noted in FIG. 6 that the use of the plugging device of the present invention will in no way damage the tube sheet or header 20. The outer face 56 of the tube sheet will not be damaged by the insertion of plug 108 and the radial deformation of tube 44 at point 104 will not damage either the tube sheet inner face 106 or the inner wall of passage 50. A new tube can be inserted into the tube sheet 20 after removal of a leaking or completely fractured tube without alterations or repair of any kind to the tube sheet.

The embodiment of the split-sleeve shown in FIG. 7 differs from the embodiment shown in FIG. 3 in that the bearing members 82 thereof are hardened and serrated or provided with peripheral teeth 134 thereon. The teeth 134 will provide a biting engagement between the bearing members 82 and the inner periphery of a tube and will thus insure a more rigid anchor between the rod and tube and in many applications of the plugging device.

While the plugging device of the present invention has been shown and herein described in connection with plugging the end of a heat exchanger tube or the like, it will be apparent to those skilled in the art that the plugging device could be also successfully employed to plug any other type of tube, conduit, pipe or the like which is adapted to carry a high pressure fluid. Furthermore, it will be obvious that many modifications and variations of the present invention are possible in the light of the above teachings. It is therefore to be understood that within the scope of the appended claim the invention may be practiced otherwise than as specifically described.

What is claimed is:

In a structure in which a tube extends through a wall of said structure a method of plugging an open end of the tube comprising the steps of positioning the frusto-conical inwardly tapered end of a rod within the tube; placing an expandible sleeve on the rod; placing a flanged spacer sleeve on the rod such that said spacer sleeve flange abuts the tube end and the end of the spacer sleeve remote from said flange abuts the end of the expandible sleeve and limits withdrawal of the expandible sleeve beyond a predetermined point within the tube; partially withdrawing the rod from the tube while holding the flange of the spacer sleeve against the tube end so as to expand the expandible sleeve and anchor the expandible sleeve and the rod within the tube; removing the flanged spacer sleeve; slidably positioning a frusto-conical sleeve over the open end of the rod into the open end of the tube; and securing the frusto-conical sleeve within the tube on the end of the rod.

References Cited in the file of this patent

UNITED STATES PATENTS

| | | |
|---|---|---|
| 586,438 | Inshaw | July 13, 1897 |
| 743,400 | Sherman | Nov. 3, 1903 |

FOREIGN PATENTS

| | | |
|---|---|---|
| 9,047 | Great Britain | 1902 |